United States Patent
Backes et al.

(10) Patent No.: US 9,250,058 B2
(45) Date of Patent: Feb. 2, 2016

(54) CAPACITIVE ROTARY ENCODER

(75) Inventors: Ulrich Backes, Radolfzell (DE); Wulf Reise, Constance (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 112 days.

(21) Appl. No.: 13/876,567

(22) PCT Filed: Sep. 28, 2011

(86) PCT No.: PCT/EP2011/004862
§ 371 (c)(1),
(2), (4) Date: Jul. 2, 2013

(87) PCT Pub. No.: WO2012/041498
PCT Pub. Date: Apr. 5, 2012

(65) Prior Publication Data
US 2013/0271119 A1    Oct. 17, 2013

(51) Int. Cl.
*G01B 7/14* (2006.01)
*G01B 7/30* (2006.01)
*G01D 5/241* (2006.01)

(52) U.S. Cl.
CPC ............... *G01B 7/30* (2013.01); *G01D 5/2415* (2013.01)

(58) Field of Classification Search
CPC .... G01R 27/2605; G01R 31/028; G01D 5/24; G01D 5/2412; G01D 5/2415; G01D 5/12; G01D 5/241; G06K 9/0002; G06F 3/044; G01N 27/226

USPC ............ 324/658, 686, 660, 661, 676, 207.13, 324/207.17, 207.25
See application file for complete search history.

(56) References Cited

U.S. PATENT DOCUMENTS 5,077,635 A * 12/1991 Bollhagen ............ G01D 5/2412
                                                              318/662
5,534,859 A * 7/1996 Meyer ...................... 340/870.37
(Continued)

FOREIGN PATENT DOCUMENTS

| CN | 101750105 | 6/2010 |
|---|---|---|
| DE | 102009044618 | 6/2010 |
| WO | 2009/027504 | 3/2009 |

OTHER PUBLICATIONS

Instruction Manual Type Gunclean Toftejorg SSt40T, Jun. 9, 2012.

*Primary Examiner* — Tung X Nguyen
*Assistant Examiner* — Thang Le
(74) *Attorney, Agent, or Firm* — Tarolli, Sundheim, Covell & Tummino LLP

(57) ABSTRACT

A capacitive rotary encoder has a stator and a rotor as well as stator electrodes firmly arranged at the stator on an encoding path coaxial to the rotor axis, and coupling electrodes arranged at the rotor. The coupling electrodes are guided over the stator electrodes at a small axial distance from the encoding path by rotation of the rotor, wherein they each cover stator electrodes adjacent in the peripheral direction and connect the latter capacitively to each other. Interrogation electronics detects for each of the stator electrodes a capacitive coupling with an adjacent stator electrode caused by a coupling electrode of the rotor. This permits the reliable detection of the angular position of the rotor both statically and dynamically.

9 Claims, 3 Drawing Sheets

(56) References Cited

U.S. PATENT DOCUMENTS

| | | |
|---|---|---|
| 5,736,865 A | 4/1998 | Nelson et al. |
| 6,252,825 B1 * | 6/2001 | Perotto .................. 368/69 |
| 6,476,683 B1 * | 11/2002 | Saito et al. .................. 332/109 |
| 6,892,590 B1 | 5/2005 | Andermo |
| 2002/0014891 A1 * | 2/2002 | Brasseur .............. G01D 5/2412 324/660 |
| 2004/0041572 A1 * | 3/2004 | Lin .................. G01D 5/2405 324/661 |
| 2004/0252032 A1 * | 12/2004 | Netzer .................. G01D 11/245 340/870.37 |
| 2006/0284622 A1 * | 12/2006 | Tola et al. .................. 324/662 |
| 2010/0148802 A1 | 6/2010 | Uchida et al. |
| 2010/0181180 A1 | 7/2010 | Peter |

\* cited by examiner

CAPACITIVE ROTARY ENCODER

RELATED APPLICATIONS

This application corresponds to PCT/EP20111004862, filed Sep. 28, 2011, which claims the benefit of German Application No. 10 2010 046 778.2, filed Sep. 28, 2010, the subject matter, of which are incorporated herein by reference in their entirety.

BACKGROUND OF THE INVENTION

The invention relates to a capacitive rotary encoder having a stator and a rotor as well as stator electrodes firmly arranged at the stator on an encoding path coaxial to the rotor axis, and coupling electrodes arranged at the rotor.

In this context, a rotary encoder is understood as a rotation-angle sensor or also as an angular position sensor. Typical applications of rotary encoders in the vehicle are steering-angle sensors or wear-free rotary switches.

Optical encoders which are expensive due to the use of optoelectronic components are known. Capacitive encoders with analog encoding are furthermore known (U.S. Pat. No. 5,736,865 A1), in which the accuracy highly depends on the quality of the signal path. In a further known capacitive encoder having a shield electrode (U.S. Pat. No. 6,892,590 B1), a coupling electrode floating in terms of potential leads to a high self-capacitance making signal evaluation more difficult.

SUMMARY OF THE INVENTION

By the present invention, a capacitive rotary encoder is provided which samples a digital encoding using a plurality of coupling electrodes, as a result of which a high reliability is obtained by redundancy. The concept of the rotary encoder permits an optimization of the surface of the coupling electrodes for a high coupling capacitance with small overlapping with adjacent stator electrodes, so that the recharging of the electrodes and thus the sampling thereof can be performed in a very short time and the space requirements are moreover minimized.

In the rotary encoder according to the invention, the coupling electrodes are guided over the stator electrodes at a small axial distance from the encoding path when the rotor is rotated, wherein they each cover stator electrodes adjacent in the peripheral direction and couple the latter capacitively to each other. Interrogation electronics detects for each of the stator electrodes a capacitive coupling with an adjacent stator electrode caused by a coupling electrode of the rotor. This permits the reliable detection of the angular position of the rotor both statically and dynamically. Therefore, the rotary encoder can on principle be used as a rotation-angle detector, for example for steering-angle detection in the vehicle, and as an angular position detector, for example in a wear-free rotary switch. The specific embodiment of the stator electrodes and of the coupling electrodes permits capacitances in the range of about 1 pF up to about 10 pF. These capacitance values can be measured directly using available microcontrollers so that implementations in a very confined space and at low manufacturing costs are possible, However, the rotary encoder meets the highest requirements as to accuracy and reliability.

Advantageous further developments of the rotary encoder are specified in the claims.

BRIEF DESCRIPTION OF THE DRAWINGS

Further features and advantages of the invention will become apparent from the description below and from the accompanying drawing, which show.

DESCRIPTION OF EXEMPLARY EMBODIMENTS

Figure 1:
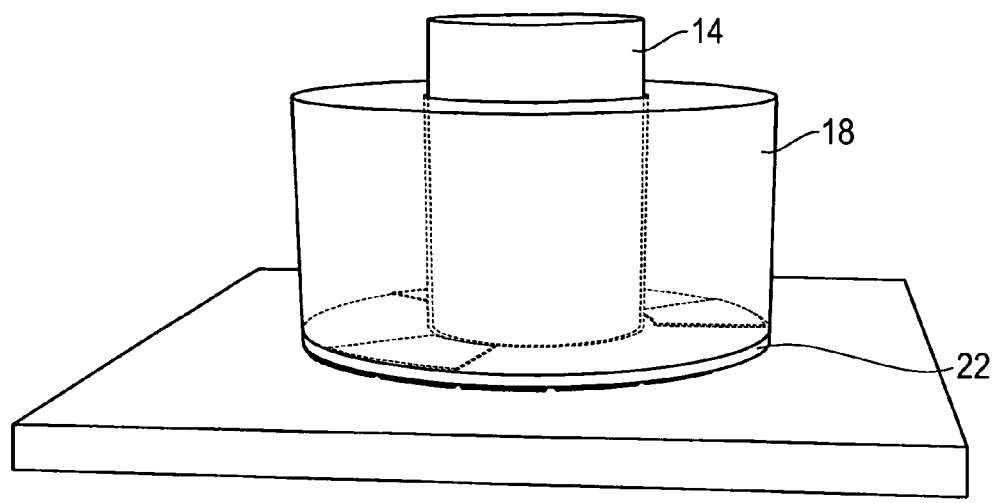
FIG. 1 a schematic general view of a capacitive rotary encoder having a circular encoding path.

The capacitive rotary encoder has a stator and a rotor. The stator is mounted onto a printed circuit board 10 which comprises a circular passage 12 for the axis 14 of the rotor. Stator electrodes 16a, 16b, 16c . . . are arranged on a circular encoding path about the passage 12. Each of these stator electrodes 16a, 16b, 16c . . . is separated from an adjacent stator electrode by a narrow gap and is electrically separated therefrom. All stator electrodes 16a, 16b, 16c . . . have the same length in the peripheral direction and the same width in the radial direction. The rotor has a cylindrical rotor body 18 which surrounds the shaft 14 coaxially and which has a plurality of coupling electrodes 20a, 20b, 20c on its end face facing the printed circuit board 10. The coupling electrodes 20a, 20b and 20c are electrically separated from each other and, in terms of potential, are arranged so as to be freely floating in a position opposite the stator electrodes 16a, 16b, 16c . . . . The length of the coupling electrodes 20a, 20b, 20c as measured in the peripheral direction is about twice as large as that of the stator electrodes, so that one coupling electrode can cover two stator electrodes. The coupling electrodes have a small axial distance from the stator electrodes, which is defined by a thin sliding disk 22 made of dielectric material.

Figure 3:
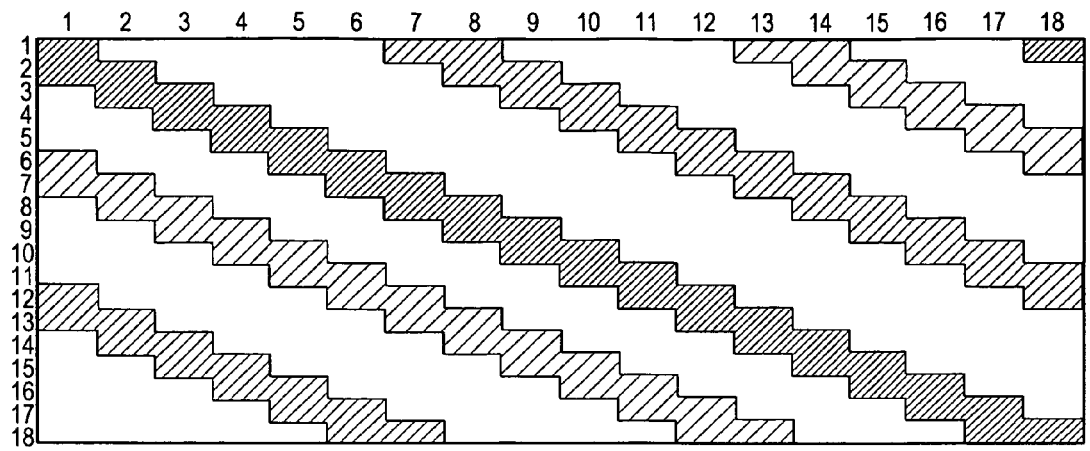
FIG. 3 a diagram for representing the encoding of the rotary encoder.

In the embodiment shown, a total of eighteen stator electrodes and three coupling electrodes are present. The coupling electrodes have different distances from each other in the peripheral direction. The distances are a multiple of the pitch of the stator electrodes on the encoding path. The distance between the coupling electrodes 20a and 20b amounts to three pitch steps, the distance between the coupling electrodes 20b and 20c amounts to four pitch steps, and the distance between the coupling electrodes 20c and 20a amounts to five pitch steps. The encoding of the rotary encoder represented in FIG. 3 results from this arrangement of stator electrodes and coupling electrodes. In FIG. 3, the numbers of the stator electrodes from 1 to 18 are specified in the vertical line. In the horizontal line, the corresponding angular positions are specified by the numbers 1 to 18. In the diagram, the covering of two stator electrodes with one coupling electrode is represented by a respective filled rectangle. The filled rectangles are each located on a line extending from the left upper part to the right lower part in the diagram, several lines of this type being produced by the three coupling electrodes in the course of rotation through 360°, which have different distances from each other. Considering the angular position number 1 in the diagram of FIG. 3, for example, two respective adjacent stator electrodes are capacitively coupled by an opposite coupling electrode in this position, more specifically the stator electrodes number 1 and 2, the stator electrodes number 6 and 7, and the stator electrodes number 12 and 13. Upon rotation of the rotor through an angular position, the numbers of the coupled stator electrodes are respectively shifted by one increment. There are thus three redundant pieces of information for each of the 18 angular positions, of which each is per se sufficient to accurately determine the current angular position.

Figure 2:
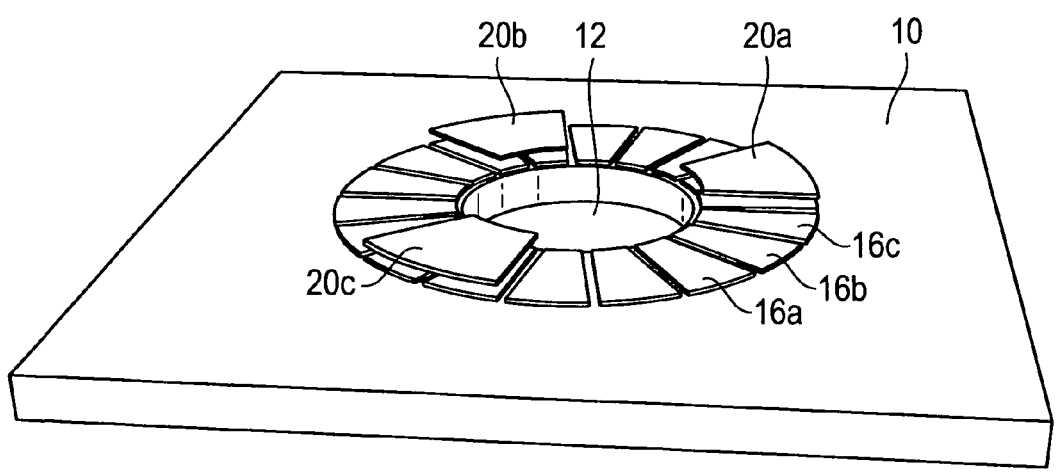
FIG. 2 a perspective representation of the electrodes of the rotary encoder of FIG. 1.
Figure 4:
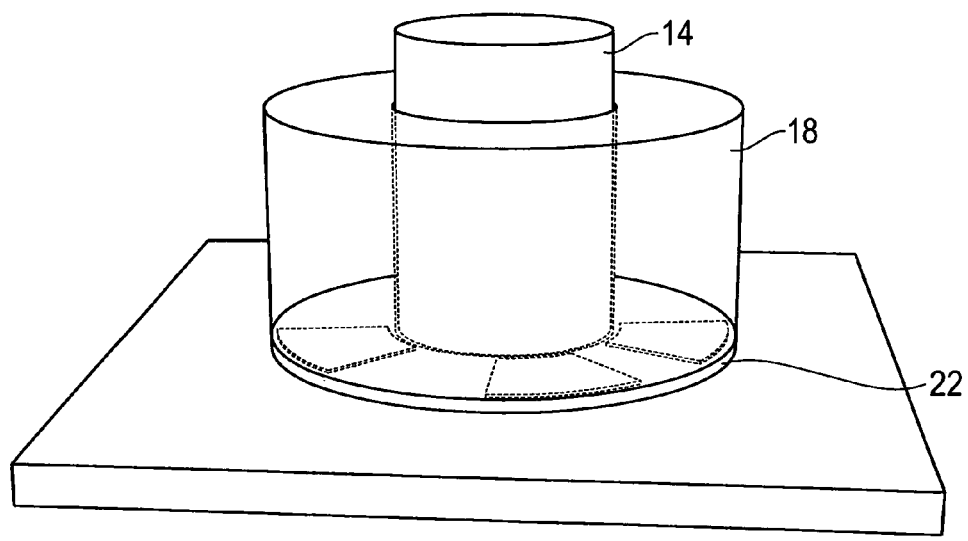
FIG. 4 a schematic general view of a capacitive rotary encoder having an encoding path in the shape of a pitch circle.
Figure 5:
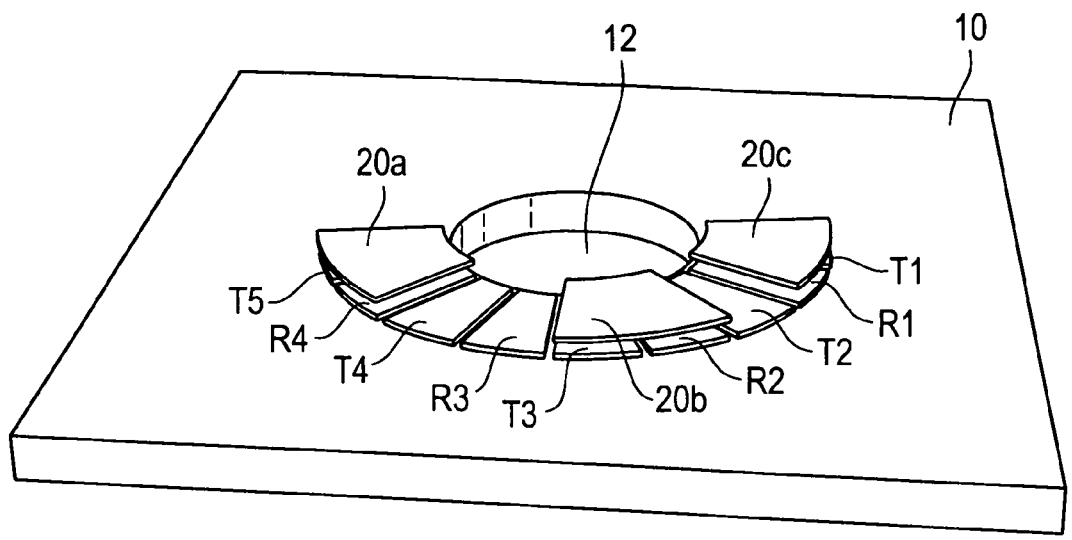
FIG. 5 a perspective representation of the electrodes of the rotary encoder of FIG. 4.
Figure 6:
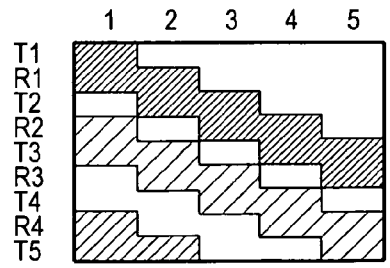
FIG. 6 a diagram for representing the encoding of the rotary encoder of FIG. 4.

The embodiment of the rotary encoder shown in FIGS. 4 to 6 differs from that of FIGS. 1 to 3 merely in the arrangement of the stator electrodes and the coupling electrodes in accordance with an encoding path located on a pitch circle having an extension of about 180°. A total of nine stator electrodes are arranged at equal angular distances on the encoding path, three coupling electrodes being arranged opposite thereto at the rotor. The distance between the coupling electrodes 20*a* and 20*b* amounts to two pitch steps, and the distance between the coupling electrodes 20*b* and 20*c* amounts to only one pitch step of the stator electrodes. Otherwise, the configuration of the rotary encoder corresponds to that of the embodiment of FIGS. 1 and 3 and is therefore not described again.

The encoding of the rotary encoder of FIGS. 4 and 5 is represented in FIG. 6. Five discrete angular positions are to be distinguished. Each of these angular positions corresponds to a switching position of a wear-free rotary switch. In the angular position number 1, the stator electrodes T1 and R1 are for example capacitively coupled by the coupling electrodes 20*c*, the stator electrodes R2 and T3 by the coupling electrode 20*b*, and the stator electrodes R4 and T5 by the coupling electrode 20*a*. Three pieces of redundant information about the current angular position are also available in this embodiment.

The covering of two adjacent stator electrodes with one coupling electrode can be detected by capacitance measurement. The measurements are repeated for all stator electrodes cyclically in a quick sequence so that it is always possible to exactly determine the current angular position. The measurement can specifically be carried out by supplying a charge to a respective stator electrode and by measuring the charge in the adjacent stator electrode. In FIG. 6, T1 refers for example to a transmitting electrode and R1 to a receiving electrode. Methods of capacitance measuring in electrodes are known from document US 2010/0181180 A1, for example.

Figure 7:
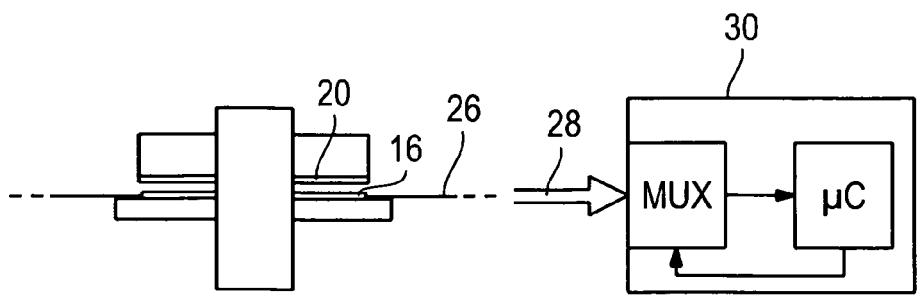
FIG. 7 a bloc diagram of a capacitive rotary encoder having interrogation electronics.

A rotary encoder system having evaluation electronics is schematically shown in FIG. 7. The stator electrodes 16 are connected to the inputs of a multiplexer MUX in the evaluation electronics 30 by means of conductors 26 combined to a bus 28. A microcontroller μC controls the multiplexer MUX and evaluates the output signal thereof. The coupling electrodes 20 at the rotor of the rotary encoder are freely floating in terms of potential and are separated from each other.

The embodiments shown are exemples. In practical implementations, the number of stator electrodes can easily be adapted to the respective need for division of the angular steps. The surface areas of the electrodes are chosen as small as possible to obtain a compact size, but large enough to obtain well measurable capacitance vales. Capacitance values in the range of about 1 pF to about 10 pF are advantageous as they can be measured directly using available, cost-effective microcontrollers.

The invention claimed is:

1. A capacitive rotary encoder having a stator and a rotor as well as stator electrodes firmly arranged at a stator on an encoding path coaxial to the rotor axis, each of these stator electrodes being electrically separated from an adjacent stator electrode of the stator electrodes, and coupling electrodes which are arranged at the rotor and are electrically separated from each other, the coupling electrodes being guided over the stator electrodes at a small axial distance from the encoding path when the rotor is rotated and each coupling electrode covering stator electrodes adjacent in the peripheral direction and connecting the latter capacitively to each other, and having interrogation electronics which detects for each of the stator electrodes a capacitive coupling with an adjacent stator electrode of the stator electrodes caused by the coupling electrode of the rotor, wherein the encoding path forms a sector of a circle on which stator electrodes are arranged in angular positions in accordance with discrete switching positions.

2. The rotary encoder according to claim 1, wherein the stator electrodes are arranged at equal angular distances along the encoding path.

3. The rotary encoder according to claim 1, wherein the coupling electrodes have a length, as measured in the peripheral direction, which corresponds approximately to the peripheral length of two adjacent stator electrodes.

4. The rotary encoder according to claim 1, wherein the stator electrodes are arranged on a printed circuit board.

5. The rotary encoder according to claim 1, wherein a sliding ring made of dielectric material is arranged between the stator electrodes and the coupling electrodes.

6. The rotary encoder according to claim 1, wherein the coupling electrodes have different distances from each other in the peripheral direction.

7. The rotary encoder according to claim 1, wherein the peripheral positions of the stator electrodes and of the coupling electrodes have the same pitch.

8. The rotary encoder according to claim 1, wherein the encoding path forms a closed circle.

9. The rotary encoder according to claim 1, wherein the interrogation electronics derives redundant angular position signals from a plurality of pairs of stator electrodes each covered with one coupling electrode.

\* \* \* \* \*